United States Patent
Hayase et al.

(10) Patent No.: US 8,849,635 B2
(45) Date of Patent: Sep. 30, 2014

(54) METHOD FOR PREDICTING MODAL DAMPING RATIO OF COMPOSITE HEAD

(75) Inventors: Seiji Hayase, Kobe (JP); Masahide Onuki, Kobe (JP)

(73) Assignee: SRI Sports Limited, Kobe (JP)

( * ) Notice: Subject to any disclaimer, the term of this patent is extended or adjusted under 35 U.S.C. 154(b) by 364 days.

(21) Appl. No.: 13/458,509

(22) Filed: Apr. 27, 2012

(65) Prior Publication Data

US 2012/0278048 A1 Nov. 1, 2012

(30) Foreign Application Priority Data

Apr. 28, 2011 (JP) ................................. 2011-100344

(51) Int. Cl.
| | |
|---|---|
| G06G 7/48 | (2006.01) |
| G06F 17/50 | (2006.01) |
| A63B 71/08 | (2006.01) |
| A63B 53/04 | (2006.01) |
| G06F 17/10 | (2006.01) |

(52) U.S. Cl.
CPC .......... *G06F 17/5009* (2013.01); *A63B 71/081* (2013.01); *A63B 53/047* (2013.01); *A63B 53/04* (2013.01); *G06F 17/50* (2013.01); *G06F 17/10* (2013.01); *G06F 17/5018* (2013.01); *G06F 2217/16* (2013.01)
USPC .................... 703/7; 703/6; 473/324; 473/332

(58) Field of Classification Search
CPC ...... A63B 53/00; A63B 53/04; A63B 71/081; A63B 53/047; A63B 53/12; G06F 17/10; G06F 17/50
USPC .............. 703/6, 7, 2; 473/316, 324, 332, 342, 473/345, 346; 702/182
See application file for complete search history.

(56) References Cited

U.S. PATENT DOCUMENTS

| | | | | |
|---|---|---|---|---|
| 2005/0004779 A1* | 1/2005 | Ueda et al. | ..................... | 702/182 |
| 2005/0090330 A1* | 4/2005 | Kumamoto | ................... | 473/345 |
| 2006/0194641 A1* | 8/2006 | Best | .............................. | 473/290 |
| 2006/0287126 A1* | 12/2006 | Aisenbrey | ..................... | 473/316 |

(Continued)

FOREIGN PATENT DOCUMENTS

JP 2006-23955 A 1/2006

OTHER PUBLICATIONS

Balmes, "Modeling damping at the material and structure levels", Proceedings of the 24th IMAC conference, 2006.*

(Continued)

*Primary Examiner* — Kandasamy Thangavelu
(74) *Attorney, Agent, or Firm* — Birch, Stewart, Kolasch & Birch, LLP

(57) ABSTRACT

A prediction method according to the present invention is a method for predicting a modal damping ratio of a composite head including two or more kinds of materials including a first material and a second material. The method includes the steps of: presuming at least a coefficient Px of a generalized Maxwell model M1 in the first material using a known material damping ratio ζ1; obtaining a calculation model of the head using the generalized Maxwell model M1; and calculating the modal damping ratio of the head based on analysis of the head using the calculation model. Preferably, the Maxwell model is further used also for the second material. Preferably, the method further includes the step of presuming a coefficient Py of a generalized Maxwell model M2 in the second material using a known material damping ratio ζ2.

13 Claims, 14 Drawing Sheets

(56) References Cited

U.S. PATENT DOCUMENTS

| | | | |
|---|---|---|---|
| 2007/0129165 A1* | 6/2007 | Matsunaga et al. | 473/345 |
| 2009/0312118 A1* | 12/2009 | Deshmukh et al. | 473/342 |
| 2010/0048325 A1* | 2/2010 | Tanimoto | 473/346 |
| 2010/0234125 A1* | 9/2010 | Aoyama et al. | 473/324 |
| 2010/0285899 A1* | 11/2010 | Soracco | 473/332 |

OTHER PUBLICATIONS

Vasques et al., "Viscoelastic Damping Technologies—Part I: Modeling and Finite Element Implementation", Journal of Advanced Research in Mechanical Engineering, 2010.* de silva, L.A., "Internal Variable and Temperature Modeling Behavior of Viscoelastic Structures—A Control Analysis", Virginia Polytechnic Institute and State University, 2003.*

Prandina, M. "Spatial Damping Identification", University of Liverpool, 2010.*

Lai et al., "Simultaneous Inversion of Rayleigh Phase Velocity and Attenuation for Near-Surface Site Characterization", Georgia Institute of Technology, 1998.*

Yamamoto et al., "Model-Based Feedforward Compensation for Disturbance During Inching and Reciprocating Motions", Electrical Engineering in Japan, Nov. 2008.*

* cited by examiner

| | A | B | C | D | E | F | G | H | I |
|---|---|---|---|---|---|---|---|---|---|
| 1 | | No. | Density ρ | Young's modulus E | Poisson's ratio ν | Shear modulus G | Volume elastic modulus K | | |
| 2 | | Material A | 0.000000014 | 49050 | 0.3 | =D2/2/(1+E2) | =D2/3/(1-2*E2) | | |
| 3 | | | | | | | | | |
| 4 | | | Young's modulus E | Poisson's ratio ν | Shear modulus Gi | Volume elastic modulus Ki | Natural angular frequency ωi(=β) | Allocation frequency fi | Material damping ratio ζ (representative value) |
| 5 | P6 | =9*D5*E5/(3*E5+D5) | =(3*E5-2*D5)/(2/(3*E5+D5)) | =(4*$I5/(1-2*$I5))*D6 | =(4*$I5/(1-2*$I5))*E6 | =1/G5 | =2*PI()*H5 | 10000 | 0.003 |
| 6 | P5 | =9*D6*E6/(3*E6+D6) | =(3*E6-2*D6)/(2/(3*E6+D6)) | =(4*$I6/(1-2*$I6))*D7 | =(4*$I6/(1-2*$I6))*E7 | =1/G6 | =2*PI()*H6 | =H5-$H$5/5 | 0.003 |
| 7 | P4 | =9*D7*E7/(3*E7+D7) | =(3*E7-2*D7)/(2/(3*E7+D7)) | =(4*$I7/(1-2*$I7))*D8 | =(4*$I7/(1-2*$I7))*E8 | =1/G7 | =2*PI()*H7 | =H6-$H$5/5 | 0.003 |
| 8 | P3 | =9*D8*E8/(3*E8+D8) | =(3*E8-2*D8)/(2/(3*E8+D8)) | =(4*$I8/(1-2*$I8))*D9 | =(4*$I8/(1-2*$I8))*E9 | =1/G8 | =2*PI()*H8 | =H7-$H$5/5 | 0.003 |
| 9 | P2 | =9*D9*E9/(3*E9+D9) | =(3*E9-2*D9)/(2/(3*E9+D9)) | =(4*$I9/(1-2*$I9))*D10 | =(4*$I9/(1-2*$I9))*E10 | =1/G9 | =2*PI()*H9 | =H8-$H$5/5 | 0.003 |
| 10 | P1 | =9*D10*E10/(3*E10+D10) | =(3*E10-2*D10)/(2/(3*E10+D10)) | =F2 | =G2 | =1/G10 | =2*PI()*H10 | =1/2/PI() | |

Fig. 6

METHOD FOR PREDICTING MODAL DAMPING RATIO OF COMPOSITE HEAD

The present application claims priority on Patent Application No. 2011-100344 filed in JAPAN on Apr. 28, 2011, the entire contents of which are hereby incorporated by reference.

BACKGROUND OF THE INVENTION

1. Field of the Invention

The present invention relates to a method for predicting a modal damping ratio of a composite head.

2. Description of the Related Art

A composite head has been known as a head including a plurality of materials. The compositing of the head advantageously enhances a degree of freedom of design. Particularly, a large-sized hollow head has a low degree of freedom of wall thickness distribution. For example, it is difficult to provide a center of gravity in a lower position in the large-sized hollow head. The composite head can solve the problem. The composite head is effective to provide the center of gravity in the lower position in the large-sized hollow head, for example.

The typical example of the compositing is combination use of a titanium alloy and a material having specific gravity lighter than that of the titanium alloy. Examples of the material having specific gravity lighter than that of the titanium alloy include CFRP and a magnesium alloy. The CFRP means carbon fiber reinforced plastic.

The use of the material having lighter specific gravity can create an excess weight. The excess weight can be disposed at a desired position. The excess weight can be utilized for design of a position of a center of gravity. Furthermore, the position of the center of gravity can be moved depending on where the material having lighter specific gravity is disposed. An example of a constitution effectively providing the center of gravity in the lower position is a head having a crown made of CFRP and a sole and a face made of a titanium alloy.

On the other hand, the composite head may bring about a short-time ball hitting sound. For example, the CFRP causes large vibrational energy loss. Therefore, the composite head including the CFRP brings about a short-time ball hitting sound. The short-time ball hitting sound tends to be undesirable for golf players. It is difficult to improve the ball hitting sound in the composite head.

A large-sized hollow head sold in these days brings about a loud ball hitting sound. Therefore, the golf players recognize the ball hitting sound as one of evaluation items of a golf club. A comfortable ball hitting sound is important for the golf players.

One of methods improving the ball hitting sound is to repeat a trial production and evaluation. However, when the ball hitting sound can be predicted by simulation, the trial production is unnecessary, to efficiently improve the ball hitting sound.

Japanese Patent Application Laid-Open No. 2006-23955 discloses a ball hitting sound prediction method. In the prediction method, a modal parameter calculated by eigenvalue analysis is used. In the gazette, a damping value obtained by experimental modal analysis is used as a mode damping value. In this case, the damping value cannot be obtained as long as a real head does not exist. Then, the experimental modal analysis is conducted using a real head having substantially the same volume as that of a calculation model, to acquire the average value of the damping values in each natural frequency up to 10 kHz.

SUMMARY OF THE INVENTION

It is difficult to predict the ball hitting sound in the composite head. One of the cause is difficult prediction of the modal damping ratio of the composite head. If the modal damping ratio can be accurately predicted, the length of the ball hitting sound can be accurately predicted. The present invention is a novel method for predicting the modal damping ratio.

It is an object of the present invention to provide a novel method for predicting a modal damping ratio of a composite head.

A prediction method according to the present invention is a method for predicting a modal damping ratio of a composite head including two or more kinds of materials including a first material and a second material. The method includes the steps of: presuming at least a coefficient Px of a generalized Maxwell model M1 in the first material using a known material damping ratio $\zeta 1$; obtaining a calculation model of the head using the generalized Maxwell model M1; and calculating the modal damping ratio of the head based on analysis of the head using the calculation model.

Preferably, the method includes the steps of: presuming the coefficient Px of the generalized Maxwell model M1 in the first material using the known material damping ratio $\zeta 1$; presuming a coefficient Py of a generalized Maxwell model M2 in the second material using a known material damping ratio $\zeta 2$; obtaining the calculation model of the head using the generalized Maxwell model M1 and the generalized Maxwell model M2; and calculating the modal damping ratio of the head based on the analysis of the head using the calculation model.

Preferably, the analysis of the head includes the steps of: performing impact response analysis; calculating a frequency response function based on a result of the impact response analysis; and calculating the modal damping ratio of the head based on the frequency response function.

Preferably, the first material is CFRP, and the second material is a titanium alloy.

Preferably, a representative value D1 having no frequency dependency is used as the material damping ratio $\zeta 1$. Preferably, a representative value D2 having no frequency dependency is used as the material damping ratio $\zeta 2$.

Preferably, the number of the parallel Maxwell models is equal to or greater than two in the generalized Maxwell model M1. Preferably, the number of the parallel Maxwell models is equal to or greater than two in the generalized Maxwell model M2.

A method for designing a head, according to the present invention includes the steps of: analyzing the head and calculating the modal damping ratio using any one of the methods; and determining disposal of materials so as to bring about a long-time ball hitting sound in consideration of the relation between the modal damping ratio and a natural mode shape in each mode.

Preferably, the determining step includes the steps of: specifying a natural mode shape Lm having a comparatively large modal damping ratio; and replacing at least a part of a region vibrating in the natural mode shape Lm with a material having a comparatively small material damping ratio.

Preferably, the determining step includes the steps of: specifying a natural mode shape Ls having a comparatively small modal damping ratio; and replacing at least a part of a region unvibrating in the natural mode shape Ls with a material having a comparatively large material damping ratio ζ.

Any one of the prediction methods is used in a ball hitting sound simulation method according to the present invention.

The modal damping ratio of the composite head can be accurately predicted.

BRIEF DESCRIPTION OF THE DRAWINGS

FIG. 6 shows a screen image displaying functions input into cells in spreadsheet software ("Excel" (trade name) manufactured by Microsoft Corporation);

DESCRIPTION OF THE PREFERRED EMBODIMENTS

Figure 1:
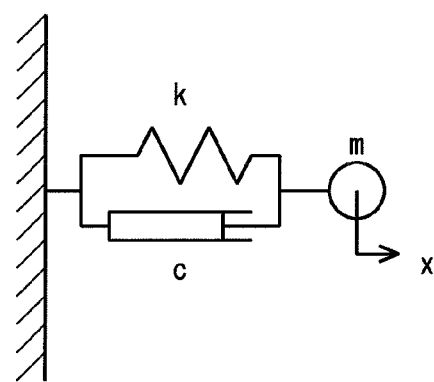
FIG. 1 describes formulation according to a generalized Maxwell model.

Hereinafter, the present invention will be described in detail based on the preferred embodiments with appropriate references to the accompanying drawings.

When a ball hitting sound is analyzed by simulation, a relational problem of sound-vibration is solved by using a surface vibrating speed (or acceleration) of a head when the head collides with a ball as a boundary condition. The surface vibrating speed of the head is damped with the passage of time. A damping ratio is an index designating a degree of the damping. Hereinafter, the surface vibrating speed of the head is merely also referred to as the surface vibrating speed.

Free vibration of the head surface can be expressed by overlapping a plurality of natural modes. Each natural mode has a natural frequency and a form of vibration. The form of vibration is merely also referred to as a natural mode shape. In one mode, elements determining the surface vibrating speed are the natural mode shape, an amplitude, the natural frequency, and a modal damping ratio. The surface vibrating speed is expressed by overlapping the surface vibrating speeds of all the modes.

The length of the ball hitting sound is determined by a duration of the vibration of the head surface. It is necessary to predict the damping ratio (that is, the modal damping ratio) in each mode in order to predict the length of the ball hitting sound.

The natural mode shape and the natural frequency can be calculated by natural value analysis (mode analysis). However, in order to obtain the modal damping ratio, an experiment is usually required.

The meaning of the simulation lies in the fact that a trial production and an experiment can be omitted. It is preferable that the modal damping ratio can be predicted without the experiment.

In the present invention, a generalized Maxwell model is used for predicting the modal damping ratio. Although the generalized Maxwell model itself is known, a method for utilizing the generalized Maxwell model is novel in the present invention.

The generalized Maxwell model is used for defining a viscoelastic material. A plurality of models is arranged in parallel in the generalized Maxwell model. The parallel can accurately express the property of the viscoelastic material.

For example, a composite head having a metal portion and a resin portion is considered. Particularly, the resin portion can be suitably treated as the generalized Maxwell model. Then, the following method is considered. First, a characteristic of a resin is actually measured by dynamic viscoelasticity measurement. A coefficient of the generalized Maxwell model is determined based on the actual measured data. Next, a calculation model is produced. The calculation model is obtained by mesh-dividing three-dimensional data of the composite head. In the calculation model, the generalized Maxwell model having the determined coefficient is applied to the resin portion. Frequency response analysis is performed using the calculation model. As a result of these processes, a loss coefficient is obtained.

However, such a method has a problem. It may be difficult to accurately and actually measure the dynamic viscoelasticities of some materials. Although it is comparatively easy to actually measure the dynamic viscoelasticity of rubber or the like, it is difficult to accurately measure the dynamic viscoelasticity of a material having a large Young's modulus and a small viscosity such as CFRP, or a metal. Since the Young's modulus of a material used for a structure of a golf club head is large, it is difficult to measure the dynamic viscoelasticity thereof.

On the other hand, in the present invention, it is unnecessary to actually measure the dynamic viscoelasticity. Also in the present invention, the generalized Maxwell model is used. However, the utilizing method of the generalized Maxwell model is different from above mentioned process. In the present invention, the coefficient of the generalized Maxwell model is determined using a material damping ratio ζ. The material damping ratio ζ is described in literatures, for example. When a material damping ratio of a material to be actually used is unknown, a material damping ratio of a similar material can be used.

Preferably, a value measured in JIS G0602:1993 (a vibration-damping characteristic test method of a laminated damping steel sheet) is used as the material damping ratio ζ. More preferably, a value measured by a "center support regular excitation method" in JIS G0602 is used. A loss coefficient η of a simple material is obtained by the "center support regular excitation method". A value of one-half of the loss coefficient η can be suitably used as the material damping ratio ζ.

The coefficient of the generalized Maxwell model can be presumed by formulation. The formulation will be described later.

[Presumption of Coefficient by Formulation]

The coefficient of the generalized Maxwell model is presumed by the following formulation. The formulation is premised on use of a known material damping ratio.

With reference to FIG. 1, when a mass is defined as m; a spring constant is defined as k; and a viscous coefficient of a dashpot is defined as c, a motion equation of a single degree of freedom system is the following formula (1).

Formula (1)

$$m\ddot{x} + c\dot{x} + kx = 0 \quad (1)$$

Generally, the following formula (2) and formula (3) are known for movement of a single degree of freedom damping system. $C_c$ is a critical damping constant; and $\zeta$ is a damping ratio. $\Omega$ is a natural angular frequency.

Formula (2)

$$c_c = 2\sqrt{mk} = 2k\sqrt{\frac{m}{k}} = \frac{2k}{\Omega} \quad (2)$$

Formula (3)

$$\zeta = \frac{c}{c_c} = \frac{c\Omega}{2k} \quad (3)$$

Figure 2:
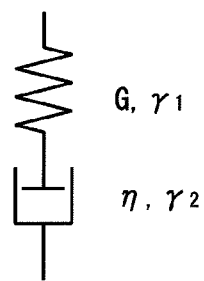
FIG. 2 describes formulation according to a generalized Maxwell model.

On the other hand, a Maxwell element is represented by the following formula (4) and formula (5) with reference to FIG. 2.

$$\sigma = G\gamma_1 = \eta\dot{\gamma}_2 \quad (4)$$

$$\gamma = \gamma_1 + \gamma_2 \quad (5)$$

G is a shear modulus of a spring; $\gamma_1$ is a shear strain of the spring; $\eta$ is a loss coefficient of the dashpot; and $\gamma$ is a shear strain of the whole Maxwell element.

A strain $\gamma = \gamma_0 e^{-i\omega t}$ sinusoidally vibrating with a strain amplitude $\gamma_0$, an angular frequency $\omega$, and a time t is applied to the Maxwell element. At this time, it is known that a complex modulus $G^*(\omega)$ defined as a ratio between a stress and a strain becomes a complex number. The modulus $G^*(\omega)$ is represented by the following formula (6). The modulus $G^*(\omega)$ is referred to as a complex modulus.

$$G^*(\omega) = G'(\omega) + iG''(\omega) \quad (6)$$

$G'(\omega)$ which is a real part is referred to as a dynamic modulus. $G''(\omega)$ which is an imaginary part is referred to as a loss modulus. It is known that these stationary solutions are the following relational formulae (7) and (8).

Formula (7)

$$G'(\omega) = \frac{G\tau^2\omega^2}{1 + \tau^2\omega^2} \quad (7)$$

Formula (8)

$$G''(\omega) = \frac{G\tau\omega}{1 + \tau^2\omega^2} \quad (8)$$

Herein, $\tau (= \eta/G)$ is a value referred to as a relaxation time.

[Formulation of Three-Element Model]

Next, a three-element model is formulated. Herein, a parallel model of the spring and the Maxwell model is considered. The natural angular frequency $\Omega$ has the relaxation time $\tau$ as a cycle, and the material damping ratio $\zeta$ in the natural angular frequency $\Omega$ is known. Furthermore, values of three properties (Young's modulus E, Poisson's ratio $\nu$, and density $\rho$) of a linear elastic body without considering the damping are known. When the Maxwell model is resonated with the natural angular frequency $\Omega$, the complex modulus $G^*(\omega)$ of the Maxwell model of FIG. 3A is represented by the following formula (9).

$$G^*(\omega) = (G_t/2) + (iG_t/2) \quad (9)$$

Figure 3A:
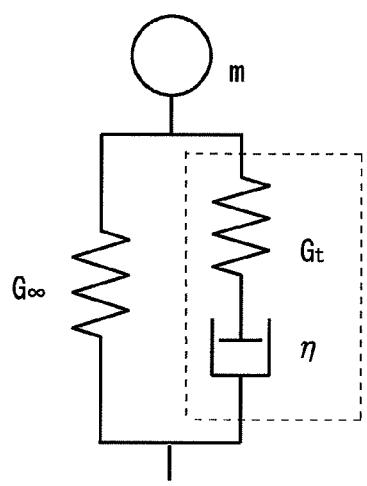
FIG. 3 describes formulation according to a generalized Maxwell model.
Figure 3B:
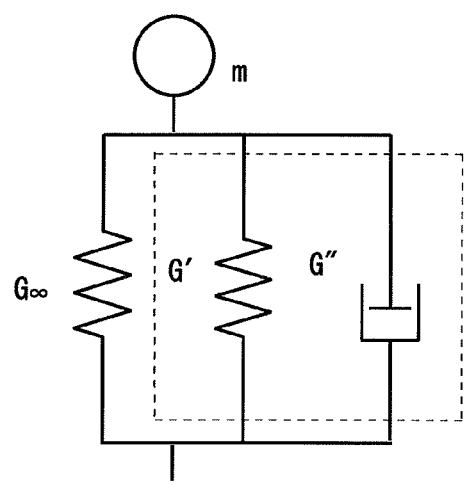

Therefore, the Maxwell model of FIG. 3A can be regarded as a model shown in FIG. 3B and having the spring of the dynamic modulus G' and the dashpot of the loss modulus G''. Therefore, the single degree of freedom damping system can be applied, and the following formula (10) is satisfied.

Formula (10)

$$\frac{c\Omega}{k} = \frac{G_t/2}{G_\infty + G_t/2} = 2\zeta \quad (10)$$

Therefore, the following formula (11), formula (12), and formula (13) are satisfied for the Maxwell three-element model. $\beta$ is a reciprocal number of the relaxation time; $G_0$ is an initial shear modulus; $G_\infty$ is a long period shear modulus; $f (=\Omega/2\pi)$ is a natural frequency; $\zeta$ is a damping ratio in the natural angular frequency $\Omega$; E is a Young's modulus; and $\nu$ is a Poisson's ratio.

Formula (11), Formula (12), Formula (13)

$$\beta = \frac{1}{\tau} = 2\pi f \quad (11)$$

$$G_0 = \left(\frac{4\zeta}{1 - 2\zeta} + 1\right)G_\infty \quad (12)$$

$$G_\infty = \frac{E}{2(1 + \nu)} \quad (13)$$

As described above, the relaxation time $\beta$, the initial shear modulus $G_0$, and the long period shear modulus $G_\infty$ are obtained as data defining a Maxwell three-element model.

[Generalization of Model]

Next, the generalized Maxwell model is considered. In a preferable generalized Maxwell model, the other Maxwell model is connected to the three-element model in parallel. In a preferable generalized Maxwell model, an independent spring element and a plurality of Maxwell models are arranged in parallel.

Figure 4:
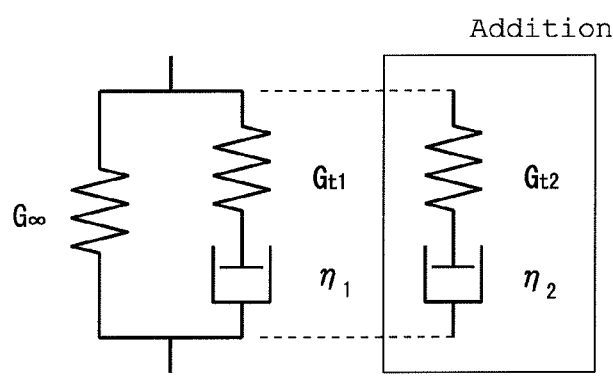
FIG. 4 describes formulation according to a generalized Maxwell model.

First, with reference to FIG. 4, the case where a Maxwell model is connected to the three-element model in parallel is considered. The added Maxwell model includes a spring having an elastic modulus $G_{t2}$, and a dashpot having a loss coefficient $\eta_2$. A damping ratio is defined as $\zeta_2$ in a natural angular frequency $\omega_2$. Herein, the Maxwell model having already existed will be described with a subscript of 1 applied to the Maxwell model. Generally, the damping characteristic of the Maxwell model has frequency dependency. When $\Omega_2$ is close to $\Omega_1$, it is considered that the influence of the loss coefficient $\eta_1$ cannot be disregarded in the damping characteristic of the generalized Maxwell model in the angular frequency $\Omega_2$. However, $\Omega_2$ and $\Omega_1$ are appropriately defined with $\Omega_2$ and $\Omega_1$ sufficiently separated from each other, and thereby the added Maxwell model is regarded as being independent in the angular frequency $\Omega_2$. Therefore, the following formula (14) and formula (15) are satisfied as in the above-mentioned three-element model. $G_{i+1}$ is an elastic modulus of the spring in the added Maxwell model, and $\beta_{i+1}$ is a reciprocal number of the relaxation time of the dashpot in the added Maxwell model. $f_{i+1}$ is a natural frequency of the added Maxwell model, and $\zeta_{i+1}$ is a damping ratio in the natural frequency $f_{i+1}$.

Formula (14)

$$\beta_{i+1} = \frac{1}{\tau_{i+1}} = 2\pi f_{i+1} = \Omega_{i+1} \qquad (14)$$

Formula (15)

$$G_{i+1} = \left(\frac{4\zeta_{i+1}}{1-2\zeta_{i+1}} + 1\right) G_i \qquad (15)$$

The Maxwell model can be further added by repeatedly using the formula (15). In this case, a natural angular frequency $\Omega_{i+1}$ of the newly added Maxwell model is made greater than the maximum value $\Omega_i$ of the natural angular frequency of the existing Maxwell model. The natural angular frequency $\Omega_{i+1}$ is a value appropriately separated from the natural angular frequency $\Omega_i$. Thereby, the newly added Maxwell model can be regarded to independently act on the existing Maxwell model. The formula (15) is repeatedly used so as to correspond to the set parallel number.

In respect of simplifying calculation, the formula (16) may be used in place of the formula (15). When the value of $\alpha$ is changed by trial and error, it is found that a comparatively good result is obtained in the case where $\alpha$ is $2 \cdot 2^{1/2}$ or greater and $2e$ or less (e is a natural base).

$$G_{i+1} = (\alpha \zeta_{i+1} + 1) G_i \qquad (16)$$

Thus, various coefficients in the generalized Maxwell model can be calculated using the natural frequencies corresponding to each of the Maxwell models arranged in parallel and the damping ratios in these natural frequencies as known data.

Figure 5:
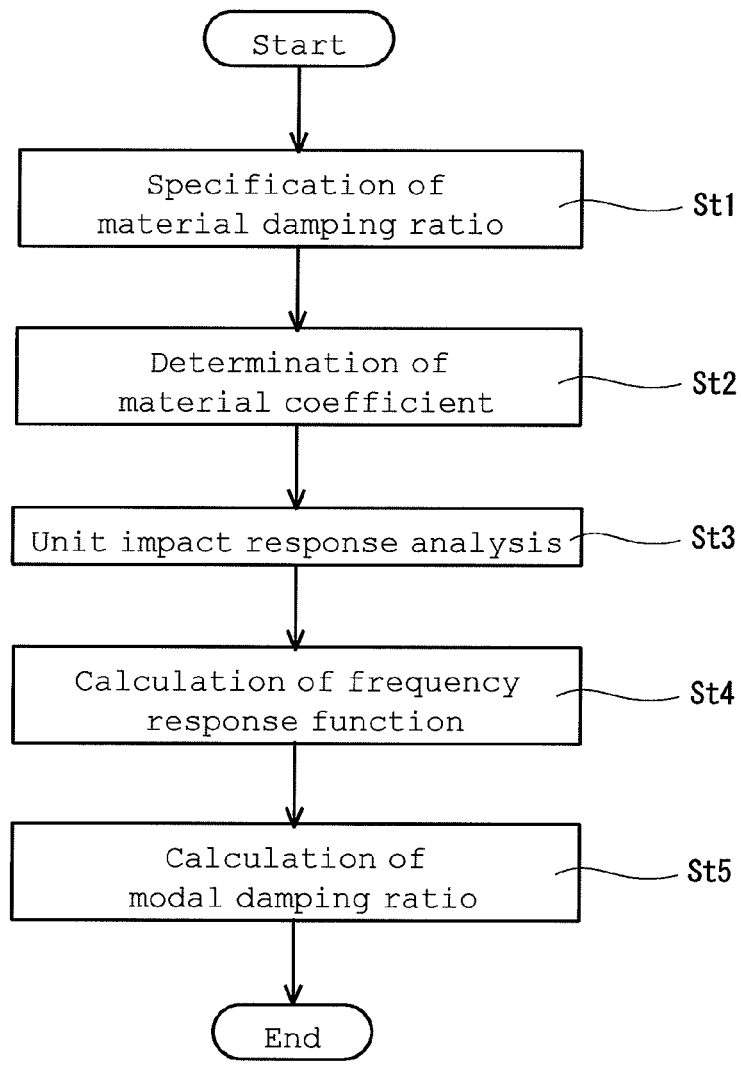
FIG. 5 is a flow chart showing a method for predicting a modal damping ratio according to an embodiment of the present invention.

Hereinafter, an embodiment of the present invention will be described in detail. FIG. 5 is a flow chart showing an embodiment of a prediction method of the modal damping ratio according to the present invention. In the embodiment, the case where two kinds of materials (a first material and a second material) are used will be described. In addition to the first material and the second material, a third material may be used. Furthermore, four or more kinds of materials may be used. In an embodiment of a head to be described later, three kinds of materials are used.

In the present invention, at least a material of a plurality of materials is defined by the generalized Maxwell model. For example, in a head including a titanium alloy portion and a CFRP portion, the generalized Maxwell model is applied to the CFRP portion, and the generalized Maxwell model may not be applied to the titanium alloy portion. In this case, the titanium alloy portion can be treated as an elastic body. More preferably, each of all the materials are defined by the generalized Maxwell model.

Preferably, at least two or more materials of the plurality of materials are defined by the generalized Maxwell model. At least three or more materials of the plurality of materials may be defined by the generalized Maxwell model. At least four or more materials of the plurality of materials may be defined by the generalized Maxwell model.

Preferably, all the materials are defined by the generalized Maxwell model.

A material damping ratio $\zeta$ is specified in the prediction method (step St1). Specifically, a material damping ratio $\zeta 1$ of the first material and a material damping ratio $\zeta 2$ of the second material are specified. The material damping ratio $\zeta 1$ and the material damping ratio $\zeta 2$ are known values. The material damping ratio $\zeta 1$ and the material damping ratio $\zeta 2$ are values described in literatures, for example. A material damping ratio of a material similar to the first material may be used as the material damping ratio $\zeta 1$. A material damping ratio of a material similar to the second material may be used as the material damping ratio $\zeta 2$.

Preferably, a representative value D1 having no frequency dependency is used as the material damping ratio $\zeta 1$. The representative value D1 is preferably used for a material having a damping ratio with no frequency dependency or a material having a damping ratio with frequency dependency capable of being disregarded. The use of the representative value D1 simplifies calculation to facilitate the prediction of the modal damping ratio. For the similar reason, preferably, a representative value D2 having no frequency dependency is used as the material damping ratio $\zeta 2$. Similarly, furthermore, when the third material exists, a material damping ratio $\zeta 3$ (representative value D3) can be used.

When the ball hitting sound of the head is evaluated, a frequency range of 2000 Hz or greater and 10000 Hz or less is roughly and sufficiently considered. The frequency dependency of the material damping ratio $\zeta$ can be disregarded in the frequency range. Therefore, the representative value D is effectively used. Specific examples of the material include pure titanium, a titanium alloy, stainless steel, CFRP, and a magnesium alloy.

Next, a material coefficient is determined (step St2). A coefficient Px related to the first material and a coefficient Py related to the second material are determined. Specifically, a coefficient Px related to a generalized Maxwell model M1 of the first material is determined using the material damping ratio $\zeta 1$. A coefficient Py related to a generalized Maxwell model M2 of the second material is determined using the material damping ratio $\zeta 2$.

The step St2 includes the step St21 of preparing a material coefficient as known data. Examples of the material coefficient include a material damping ratio $\zeta$, a density $\rho$, a Young's modulus (longitudinal elastic modulus) E, a Poisson's ratio $\nu$, a shear modulus G, and a volume elastic modulus K. When the material can be regarded as an isotropic material, the known formula applied to isotropic materials can be used. Therefore, for example, the shear modulus G can be obtained from the Young's modulus E and the Poisson's ratio $\nu$. The volume elastic modulus K can be obtained from the Young's modulus E and the shear modulus G.

As these known data, literature values can be employed. Particularly, the material damping ratio $\zeta$ can be also obtained by experimental modal analysis.

The step St2 includes the step St22 of determining a frequency corresponding to the number of the parallel Maxwell models. For example, when the number of the parallel Maxwell models is N, N kinds of frequencies (hereinafter, also referred to as allocation frequencies) are determined. N is an integer of 1 or more, and preferably an integer of 2 or more. The allocation frequency corresponds to the above-mentioned natural angular frequency $\Omega$. The allocation frequency is determined for each of the Maxwell models arranged in parallel. A particularly important frequency band in ball hitting sound analysis of a golf head is 2000 Hz or greater and 10000 Hz or less. Therefore, the N kinds of allocation frequencies included in the band of 2000 Hz or greater and 10000 Hz or less are preferably determined.

In respect of the simulation accuracy of the ball hitting sound, the integer N is preferably equal to or greater than 3, and more preferably equal to or greater than 4. In respect of simplification of calculation, the integer N is preferably equal to or less than 10, more preferably equal to or less than 9, and still more preferably equal to or less than 8.

In respect of the simulation accuracy of the ball hitting sound, it is preferable that the N kinds of frequencies are equally dispersed in an important frequency band. When these N kinds of frequencies are defined as $f_1, f_2, \ldots, f_N$ in ascending order of the frequencies, the difference $(f_{m+1}-f_m)$ between the adjacent frequencies is considered. In respect of enhancing the independency of each Maxwell model, the minimum value of the difference $(f_{m+1}-f_m)$ is preferably equal to or greater than 500 Hz, more preferably equal to or greater than 1000 Hz, and still more preferably equal to or greater than 1500 Hz. On the other hand, when the difference $(f_{m+1}-f_m)$ is excessive, the simulation accuracy of the ball hitting sound may be reduced. In this respect, the maximum value of the difference $(f_{m+1}-f_m)$ is preferably equal to or less than 3000 Hz, and more preferably equal to or less than 2500 Hz.

The number of the parallel Maxwell models is not limited in the generalized Maxwell model. In respect of the simulation accuracy of the ball hitting sound, the number of the parallel Maxwell models is preferably equal to or greater than two, more preferably equal to or greater than three, and still more preferably equal to or greater than four. In respect of simplification of calculation, the number of the parallel Maxwell models is preferably equal to or less than ten, more preferably equal to or less than nine, and still more preferably equal to or less than eight. The independent spring element is not included in the number of the parallel Maxwell models. Therefore, in the generalized Maxwell model of example to be described later, the number of the parallel Maxwell models is 5.

Furthermore, the step St2 includes the step St23 of calculating the coefficients (Px, Py) of the Maxwell model based on the material coefficient. In the step St23, the coefficients is calculated for each of the Maxwell models arranged in parallel.

More particularly, the step St23 includes the step St231 of determining a coefficient P1 of the independent spring element, the step St232 of calculating a coefficient P2 of the Maxwell model having the lowest allocation frequency based on the coefficient P1, and the step St23n of sequentially calculating a coefficient Pn of the Maxwell model in ascending order of the allocation frequency based on the coefficient P2. For example, when the generalized Maxwell model is a 6 parallel model, the step St23 includes the step St231 of determining the coefficient P1, the step St232 of calculating the coefficient P2 based on the coefficient P1, the step St233 of calculating the coefficient P3 based on the coefficient P2, the step St234 of calculating the coefficient P4 based on the coefficient P3, the step St235 of calculating the coefficient P5 based on the coefficient P4, and the step St236 of calculating the coefficient P6 based on the coefficient P5. The 6 parallel model is a model in which an independent spring element and five Maxwell models are arranged in parallel. Therefore, in the 6 parallel model, the number of the parallel Maxwell models is 5. The generalized Maxwell model in which the independent spring element does not exist may be used. That is, all the elements arranged in parallel may be the Maxwell models.

The coefficient P1 of the independent spring element is the same as the material coefficient. The frequency of the independent spring element is set to zero. The coefficient Pn of the Maxwell model is sequentially calculated in ascending order of the allocation frequency based on the coefficient P1. The formula (15) is used for the calculation. Commercially available spreadsheet software can be used for the calculation. For example, "Excel" (trade name) manufactured by Microsoft Corporation can be used.

A set of the coefficients P1, P2, and . . . Pn is the coefficient Px related to the first material. Similarly, the coefficient Py related to the second material is also obtained. Specific example of these calculations is shown in FIG. 6 (function expressions in an Excel sheet) to be described later.

Next, the analysis of the head is performed using the obtained calculation model. The analysis of the head includes the step of performing unit impact response analysis, the step of calculating a frequency response function, and the step of calculating the modal damping ratio of the head.

The calculation model is three-dimensional data of the head. The calculation model is the composite head. Preferably, the calculation model is a hollow head. In respect of the volume of the ball hitting sound, the head volume of the calculation model is preferably equal to or greater than 400 cc, and more preferably equal to or greater than 420 cc. In respect of suitability to the golf rule, the head volume of the calculation model is preferably equal to or less than 470 cc.

The calculation model has a portion including the first material and a portion including the second material. The calculation model includes at least two kinds of materials. The calculation model may include three or more kinds of materials.

A preferable method of the unit impact response analysis is a finite element method. Preferably, the calculation model is mesh-divided by a commercially available preprocessor (HyperMesh or the like). The calculation model mesh-divided into finite elements is used.

In the case of usual simulation, a longitudinal elastic modulus, a density, and a Poisson's ratio are used as the property values of the material. However, in the present invention, a material modeled by the generalized Maxwell model is used. That is, the generalized Maxwell model defined by the coefficients Px and Py is used.

An impact force is applied to the calculation model in the unit impact response analysis. Since the unit impact response and the frequency response function form a Fourier transform pair, the unit impact response is merely Fourier transformed to obtain the frequency response function. Therefore, a preferable impact force is a unit impact force. Preferably, an impact force is applied for a comparatively short time. However, change in a time shorter than a time step is not considered when calculating in a time domain. When the time step of the head and the ball is considered, the time of the impact force is preferably 5 μs or greater and 0.5 ms or less. The waveform of the impact force is not limited. For example, the waveform of the impact force may be a sine curve. The impact force may be a constant force.

A position where the impact force is applied is not limited. Preferably, the impact force is applied to a face surface. More preferably, the impact force is applied to the vicinity of the center of the face surface. The vicinity of the center of the face surface is within 5 mm from the center of figure of the face surface, for example.

CAE software is used for the unit impact response analysis. Examples of the CAE software include "LS-DYNA" (trade name) manufactured by (Livermore Software Technology Corporation). Preferably, the analysis of the finite element method is executed by the CAE software.

A constraint condition (boundary condition) in the unit impact response analysis is not limited. Since the ball hitting sound is generated by free vibration of the head, the constraint condition is preferably free.

As a result of the unit impact response analysis, a value V1 related to the vibration of the head surface is obtained in time history. Examples of the value V1 include acceleration, speed, and displacement. The value V1 in each point on the head surface can be obtained in time history. The value V1 in any point S1 is employed. The region and point number of the points S1 are not limited. In respect of the calculation accuracy of the modal damping ratio, the number of the points S1 is preferably several in each of a face, a crown, and a sole. The points S1 are more preferably on the whole head.

Next, the frequency response function is calculated (step St4). Generally, an input-to-output ratio is referred to as a transfer function. The transfer function defined with frequency as an independent variable is referred to as the frequency response function. Examples of the frequency response function include inertance, mobility, and compliance. The inertance is a ratio between the output acceleration and the input force. The mobility is a ratio between the output speed and the input force. The compliance is a ratio between the output displacement and the input force. The typical example of the input force is the impact force.

The Fourier transform (FFT) is used in the calculation of the frequency response function. The value of the time domain is converted into the value of the frequency domain by the Fourier transform, to obtain a Fourier spectrum. Herein, the value V1 obtained in the time history is Fourier transformed, and the force of the time history is also Fourier transformed. The frequency response function is obtained by dividing the two obtained power spectra. The method is known.

Preferably, numerical analysis software is used for calculating the frequency response function. Examples of the numerical analysis software includes "MATLAB" (trade name) manufactured by Math Works.

Next, the modal damping ratio is calculated (step St5). The modal damping ratio is calculated based on the frequency response function. Curve fitting is preferably used for calculating the modal damping ratio. In the curve fitting, the least-square method is usually used. An SDOF method (Single Degree Of Freedom method), an MDOF method (Multiple Degrees Of Freedom method), and an MMDOF method (Multiple Functions Multiple Degrees Of Freedom method) are known as the method of the curve fitting. The method of the curve fitting is not limited and known methods can be employed for the cure fitting.

The modal damping ratio is calculated in each peak in the frequency response function. The modal damping ratio is calculated based on a peak shape. Preferably, the modal damping ratio is calculated based on the peak shape after the curve fitting.

Preferably, modal analysis software is used for calculating the modal damping ratio. Examples of the modal analysis software includes "ME' scopeVES" (trade name) manufactured by Vibrant Technology, Inc.

The modal damping ratio thus calculated enhances the predictive accuracy of the ball hitting sound of the composite head. In particular, the length of the ball hitting sound of the composite head can be accurately predicted. The modal damping ratio can be useful for improving the ball hitting sound of the composite head.

Another aspect of the present invention is a method for designing a head. In the method, the relation between the modal damping ratio and the natural mode shape in each mode is considered in the result of the analysis of the head. The disposal of the materials is determined so as to bring about a long-time ball hitting sound.

The step of determining the disposal of the materials so as to bring about a long-time ball hitting sound preferably includes the following step a1 and step a2:

(step a1): the step of specifying a natural mode shape Lm having a comparatively large modal damping ratio; and (step a2): the step of replacing at least apart of a region vibrating in the natural mode shape Lm with a material having a comparatively small material damping ratio.

The step of determining the disposal of the materials so as to bring about a long-time ball hitting sound may include the following step a1 and step a3;

(step a1): the step of specifying a natural mode shape Lm having a comparatively large modal damping ratio; and (step a3): the step of subjecting at least apart of a region vibrating in the natural mode shape Lm to dimensional change and/or shape change.

The step of determining the disposal of the materials so as to bring about a long-time ball hitting sound may include the step a1, the step a2, and the step a3.

The "material having a comparatively small damping ratio" in the step a2 is preferably a material having the smallest material damping ratio $\zeta$, of the materials used for the composite head.

An example of the step a2 is the step of replacing at least a part of the region vibrating in the natural mode shape Lm with a titanium alloy in place of CFRP. The ball hitting sound can be lengthened by the replacement.

In respect of the ball hitting sound, the natural mode shape Lm having the largest modal damping ratio may be specified in the step a1. However, it's not always true that the natural mode shape Lm having the largest modal damping ratio may be specified when contribution in the spectrum of the ball hitting sound is considered. Preferably, in the step a1, the natural mode shape Lm is specified in consideration of the magnitude of the modal damping ratio and/or the magnitude of response in the excitation of the face.

In respect of suppressing variation in a weight of the head and a position of a center of gravity of the head, the step of determining the disposal of the materials so as to bring about a long-time ball hitting sound may include the following step b1 and step b2. These steps can lengthen the ball hitting sound without reducing the amount of the CFRP to be used, for example.

(step b1): the step of specifying a natural mode shape Ls having a comparatively small modal damping ratio; and (step b2): the step of replacing at least a part of a region unvibrating in the natural mode shape Ls with a material having a comparatively large damping ratio $\zeta$.

In respect of the ball hitting sound, a natural mode shape Ls having the smallest modal damping ratio may be specified in the step b1. However, it's not always true that the natural mode shape Ls having the smallest modal damping ratio may be specified when contribution in the spectrum of the ball hitting sound is considered. Preferably, in the step b1, the natural mode shape Ls is specified in consideration of the magnitude of the modal damping ratio and/or the magnitude of response in the excitation of the face.

Thus, the present invention can provide a designing method effective for lengthening the ball hitting sound of the composite head.

EXAMPLES

Hereinafter, the effects of the present invention will be clarified by examples. However, the present invention should not be interpreted in a limited way based on the description of examples.

In Tables of the present application, powers of ten are written using a character E. For example, "×10$^5$" is written as "E+05". "×10$^{-5}$" is written as "E−05". Therefore, for example, "3.00 E−01" means "3.00×10$^{-1}$".

[Preparation of Materials]

The following six kinds of materials A to F were assumed. ρ is a density (t/mm$^3$); E is a Young's modulus (MPa); ν is a Poisson's ratio; and ζ is a material damping ratio (%). The material damping ratio ζ was set as a representative value having no frequency dependency.

(1) Material A: ρ=1.40×10$^{-9}$ $E=4.91\times 10^4$ $\nu=3.00\times 10^{-1}$ $\zeta=0.3$ (2) Material B: ρ=4.72×10$^{-9}$ $E=9.50\times 10^4$ $\nu=3.50\times 10^{-1}$ $\zeta=0.3$ (3) Material C: ρ=4.42×10$^{-9}$ $E=1.13\times 10^5$ $\nu=3.00\times 10^{-1}$ $\zeta=0.3$ (4) Material D: ρ=1.40×10$^{-9}$ $E=4.91\times 10^4$ $\nu=3.00\times 10^{-1}$ $\zeta=1.5$ (5) Material E: ρ=4.72×10$^{-9}$ $E=7.70\times 10^4$ $\nu=3.55\times 10^{-1}$ $\zeta=0.3$ (6) Material F: ρ=4.72×10$^{-9}$ $E=7.70\times 10^4$ $\nu=3.55\times 10^{-1}$ $\zeta=1.5$ CFRP is assumed in the materials A and D. A titanium alloy is assumed in the materials B, C, E, and F.

[Calculation of Coefficient of Generalized Maxwell Model]

Functions (formulae) for calculating coefficients P1 to P6 of a generalized Maxwell model were prepared. These functions were input into spreadsheet software ("Excel" (trade name) manufactured by Microsoft Corporation). FIG. 6 shows formulae of the functions input into the spreadsheet software. FIG. 6 shows the functions input into an Excel sheet. Line numbers and column signs are shown in FIG. 6. Therefore, specific calculating formulae output to cells can be understood from FIG. 6. The meaning of the formulae is described as above.

The calculating example of FIG. 6 is a generalized Maxwell model in which five Maxwell models and an independent spring element are arranged in parallel. In the model, the number of the parallel Maxwell models is five.

In the calculation in the sheet, a density ρ, a Young's modulus E, a Poisson's ratio ν, and a material damping ratio ζ are first input as known material coefficients. "10000 Hz" is input as the maximum allocation frequency. The spreadsheet software calculates based on these known values to show calculation results in the cells.

In the sheet of FIG. 6, cells into which known values are input are surrounded by thick lines. In the sheet of FIG. 6, the material coefficients of the material A are input into these cells.

In the sheet of FIG. 6, the allocation frequencies are set to be equally dispersed in a predetermined frequency domain.

In the sheet of FIG. 6, 10000 Hz is input as the maximum allocation frequency. The allocation frequencies are set at an equal interval of a value (2000 Hz) obtained by dividing the maximum allocation frequency by the number of the parallel Maxwell models.

The following Table 1 shows the results obtained by calculating the coefficients of the generalized Maxwell model for the material A. As shown in Table 1, all the coefficients of the generalized Maxwell model (6 parallel model) were calculated by inputting the material coefficients and the allocation frequencies.

TABLE 1

Calculation results of coefficients of generalized Maxwell model (material A)

| No. | Density ρ | Young's modulus E | Poisson's ratio ν | Shear modulus G | Volume elastic modulus K |
|---|---|---|---|---|---|
| Material A | 1.40E−09 | 4.91E+04 | 3.00E−01 | 1.887E+04 | 4.088E+04 |

| Coefficient | Young's modulus E | Poisson's ratio ν | Shear modulus Gi | Volume elastic modulus Ki | Relaxation time τi | Natural angular frequency ωi (=β) | Allocation frequency fi | Material damping ratio ζ (representative value) |
|---|---|---|---|---|---|---|---|---|
| P6 | 1.258E−05 | 0.300 | 4.838E−06 | 1.048E−05 | 1.592E−05 | 6.283E+04 | 10000 | 0.3% |
| P5 | 1.042E−03 | 0.300 | 4.007E−04 | 8.682E−04 | 1.989E−05 | 5.027E+04 | 8000 | 0.3% |
| P4 | 8.630E−02 | 0.300 | 3.319E−02 | 7.192E−02 | 2.653E−05 | 3.770E+04 | 6000 | 0.3% |
| P3 | 7.149E+00 | 0.300 | 2.750E+00 | 5.957E+00 | 3.979E−05 | 2.513E+04 | 4000 | 0.3% |
| P2 | 5.922E+02 | 0.300 | 2.278E+02 | 4.935E+02 | 7.958E−05 | 1.257E+04 | 2000 | 0.3% |
| P1 | 4.905E+04 | 0.300 | 1.887E+04 | 4.088E+04 | 1.000E+00 | 1.000E+00 | 0 | |

The coefficients of the generalized Maxwell model were calculated for the materials B to F as in the material A. The result of the material B is shown in the following Table 2. The result of the material C is shown in the following Table 3. The result of the material D is shown in the following Table 4. The result of the material E is shown in the following Table 5. The result of the material F is shown in the following Table 6.

TABLE 2

Calculation results of coefficients of generalized Maxwell model (material B)

| No. | Density $\rho$ | Young's modulus E | Poisson's ratio $\nu$ | Shear modulus G | Volume elastic modulus K |
|---|---|---|---|---|---|
| Material B | 4.72E−09 | 9.50E+04 | 3.50E−01 | 3.519E+04 | 1.056E+05 |

| Coefficient | Young's modulus E | Poisson's ratio $\nu$ | Shear modulus Gi | Volume elastic modulus Ki | Relaxation time $\tau$i | Natural angular frequency $\omega$i (=$\beta$) | Allocation frequency fi | Material damping ratio $\zeta$ (representative value) |
|---|---|---|---|---|---|---|---|---|
| P6 | 2.436E−05 | 0.350 | 9.023E−06 | 2.707E−05 | 1.592E−05 | 6.283E+04 | 10000 | 0.3% |
| P5 | 2.018E−03 | 0.350 | 7.474E−04 | 2.242E−03 | 1.989E−05 | 5.027E+04 | 8000 | 0.3% |
| P4 | 1.672E−01 | 0.350 | 6.191E−02 | 1.857E−01 | 2.653E−05 | 3.770E+04 | 6000 | 0.3% |
| P3 | 1.385E+01 | 0.350 | 5.128E+00 | 1.538E+01 | 3.979E−05 | 2.513E+04 | 4000 | 0.3% |
| P2 | 1.147E+03 | 0.350 | 4.248E+02 | 1.274E+03 | 7.958E−05 | 1.257E+04 | 2000 | 0.3% |
| P1 | 9.500E+04 | 0.350 | 3.519E+04 | 1.056E+05 | 1.000E+00 | 1.000E+00 | 0 | |

TABLE 3

Calculation results of coefficients of generalized Maxwell model (material C)

| No. | Density $\rho$ | Young's modulus E | Poisson's ratio $\nu$ | Shear modulus G | Volume elastic modulus K |
|---|---|---|---|---|---|
| Material C | 4.42E−09 | 1.13E+05 | 3.00E−01 | 4.346E+04 | 9.417E+04 |

| Coefficient | Young's modulus E | Poisson's ratio $\nu$ | Shear modulus Gi | Volume elastic modulus Ki | Relaxation time $\tau$i | Natural angular frequency $\omega$i (=$\beta$) | Allocation frequency fi | Material damping ratio $\zeta$ (representative value) |
|---|---|---|---|---|---|---|---|---|
| P6 | 2.898E−05 | 0.300 | 1.114E−05 | 2.415E−05 | 1.592E−05 | 6.283E+04 | 10000 | 0.3% |
| P5 | 2.400E−03 | 0.300 | 9.232E−04 | 2.000E−03 | 1.989E−05 | 5.027E+04 | 8000 | 0.3% |
| P4 | 1.988E−01 | 0.300 | 7.647E−02 | 1.657E−01 | 2.653E−05 | 3.770E+04 | 6000 | 0.3% |
| P3 | 1.647E+01 | 0.300 | 6.334E+00 | 1.372E+01 | 3.979E−05 | 2.513E+04 | 4000 | 0.3% |
| P2 | 1.364E+03 | 0.300 | 5.247E+02 | 1.137E+03 | 7.958E−05 | 1.257E+04 | 2000 | 0.3% |
| P1 | 1.130E+05 | 0.300 | 4.346E+04 | 9.417E+04 | 1.000E+00 | 1.000E+00 | 0 | |

TABLE 4

Calculation results of coefficients of generalized Maxwell model (material D)

| No. | Density $\rho$ | Young's modulus E | Poisson's ratio $\nu$ | Shear modulus G | Volume elastic modulus K |
|---|---|---|---|---|---|
| Material D | 1.40E−09 | 4.91E+04 | 3.00E−01 | 1.887E+04 | 4.088E+04 |

| Coefficient | Young's modulus E | Poisson's ratio $\nu$ | Shear modulus Gi | Volume elastic modulus Ki | Relaxation time $\tau$i | Natural angular frequency $\omega$i (=$\beta$) | Allocation frequency fi | Material damping ratio $\zeta$ (representative value) |
|---|---|---|---|---|---|---|---|---|
| P6 | 4.442E−02 | 0.300 | 1.708E−02 | 3.701E−02 | 1.592E−05 | 6.283E+04 | 10000 | 1.5% |
| P5 | 7.181E−01 | 0.300 | 2.762E−01 | 5.984E−01 | 1.989E−05 | 5.027E+04 | 8000 | 1.5% |
| P4 | 1.161E+01 | 0.300 | 4.465E+00 | 9.674E+00 | 2.653E−05 | 3.770E+04 | 6000 | 1.5% |
| P3 | 1.877E+02 | 0.300 | 7.218E+01 | 1.564E+02 | 3.979E−05 | 2.513E+04 | 4000 | 1.5% |
| P2 | 3.034E+03 | 0.300 | 1.167E+03 | 2.528E+03 | 7.958E−05 | 1.257E+04 | 2000 | 1.5% |
| P1 | 4.905E+04 | 0.300 | 1.887E+04 | 4.088E+04 | 1.000E+00 | 1.000E+00 | 0 | |

TABLE 5

Calculation results of coefficients of generalized Maxwell model (material E)

| No. | Density ρ | Young's modulus E | Poisson's ratio ν | Shear modulus G | Volume elastic modulus K |
|---|---|---|---|---|---|
| Material E | 4.72E−09 | 7.70E+04 | 3.55E−01 | 2.841E+04 | 8.851E+04 |

| Coefficient | Young's modulus E | Poisson's ratio ν | Shear modulus Gi | Volume elastic modulus Ki | Relaxation time τi | Natural angular frequency ωi (=β) | Allocation frequency fi | Material damping ratio ζ (representative value) |
|---|---|---|---|---|---|---|---|---|
| P6 | 1.975E−05 | 0.355 | 7.286E−06 | 2.270E−05 | 1.592E−05 | 6.283E+04 | 10000 | 0.3% |
| P5 | 1.636E−03 | 0.355 | 6.035E−04 | 1.880E−03 | 1.989E−05 | 5.027E+04 | 8000 | 0.3% |
| P4 | 1.355E−01 | 0.355 | 4.999E−02 | 1.557E−01 | 2.653E−05 | 3.770E+04 | 6000 | 0.3% |
| P3 | 1.122E+01 | 0.355 | 4.141E+00 | 1.290E+01 | 3.979E−05 | 2.513E+04 | 4000 | 0.3% |
| P2 | 9.296E+02 | 0.355 | 3.430E+02 | 1.068E+03 | 7.958E−05 | 1.257E+04 | 2000 | 0.3% |
| P1 | 7.700E+04 | 0.355 | 2.841E+04 | 8.851E+04 | 1.000E+00 | 1.000E+00 | 0 | |

TABLE 6

Calculation results of coefficients of generalized Maxwell model (material F)

| No. | Density ρ | Young's modulus E | Poisson's ratio ν | Shear modulus G | Volume elastic modulus K |
|---|---|---|---|---|---|
| Material F | 4.72E−09 | 7.70E+04 | 3.55E−01 | 2.841E+04 | 8.851E+04 |

| Coefficient | Young's modulus E | Poisson's ratio ν | Shear modulus Gi | Volume elastic modulus Ki | Relaxation time τi | Natural angular frequency ωi (=β) | Allocation frequency fi | Material damping ratio ζ (representative value) |
|---|---|---|---|---|---|---|---|---|
| P6 | 6.972E−02 | 0.355 | 2.573E−02 | 8.014E−02 | 1.592E−05 | 6.283E+04 | 10000 | 1.5% |
| P5 | 1.127E+00 | 0.355 | 4.159E−01 | 1.296E+00 | 1.989E−05 | 5.027E+04 | 8000 | 1.5% |
| P4 | 1.822E+01 | 0.355 | 6.724E+00 | 2.095E+01 | 2.653E−05 | 3.770E+04 | 6000 | 1.5% |
| P3 | 2.946E+02 | 0.355 | 1.087E+02 | 3.386E+02 | 3.979E−05 | 2.513E+04 | 4000 | 1.5% |
| P2 | 4.763E+03 | 0.355 | 1.758E+03 | 5.475E+03 | 7.958E−05 | 1.257E+04 | 2000 | 1.5% |
| P1 | 7.700E+04 | 0.355 | 2.841E+04 | 8.851E+04 | 1.000E+00 | 1.000E+00 | 0 | |

Example 1

The materials B, C, and D were employed as the materials of the composite head. The coefficients of the generalized Maxwell model for each of the materials were obtained using the sheet of FIG. 6. The maximum allocation frequency was set to 10000 Hz. The material damping ratio ζ was a representative value having no frequency dependency in the material B, C, and D.

Three-dimensional data of a wood type golf club head H1 was prepared as a calculation model. The head H1 was a composite head including three kinds of materials (the materials B, C, and D). The head H1 is hollow. The head volume of the head H1 was set to 435 cc.

Figure 7:
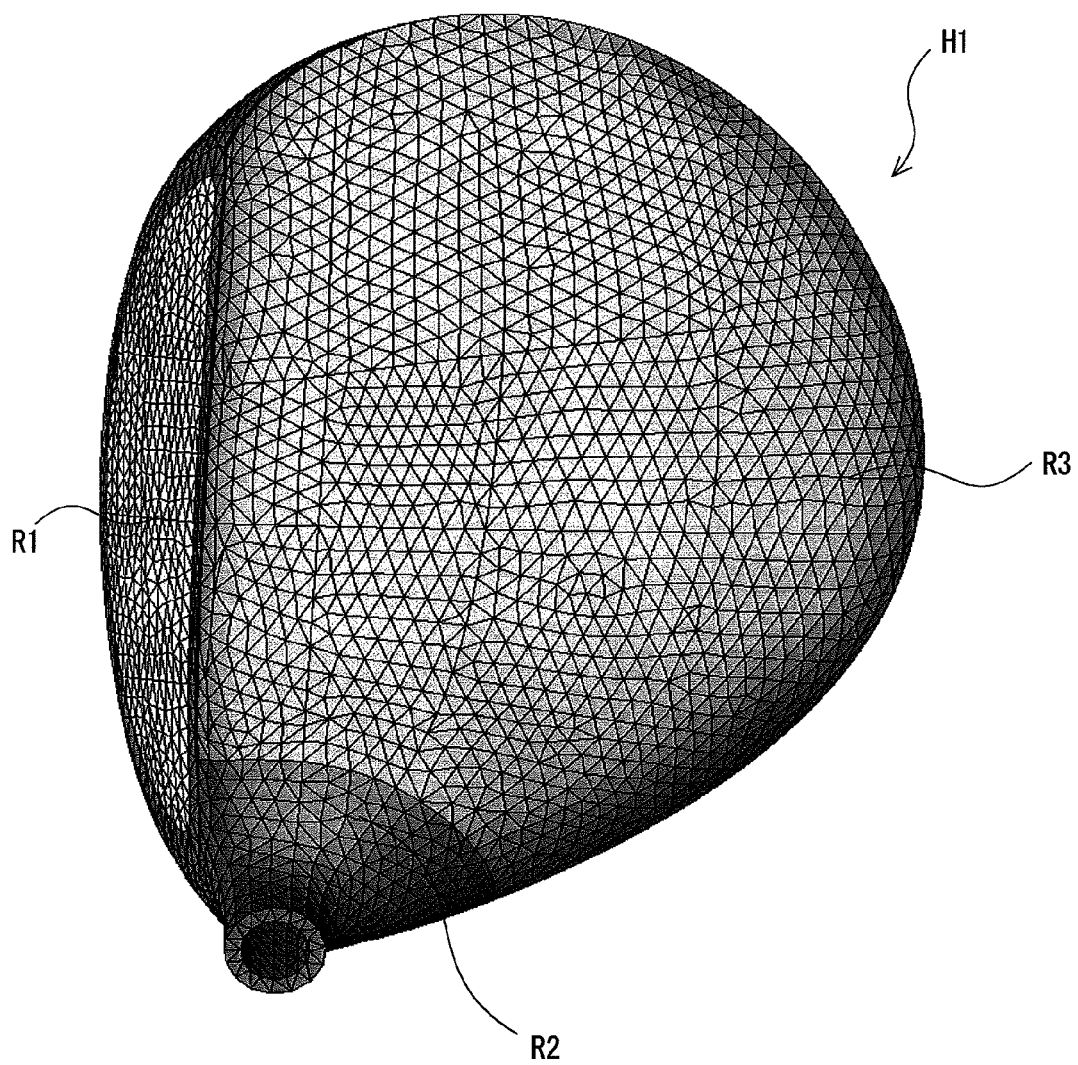
FIG. 7 is a plan view of a head according to example, and uses a CAD screen image.
Figure 8:
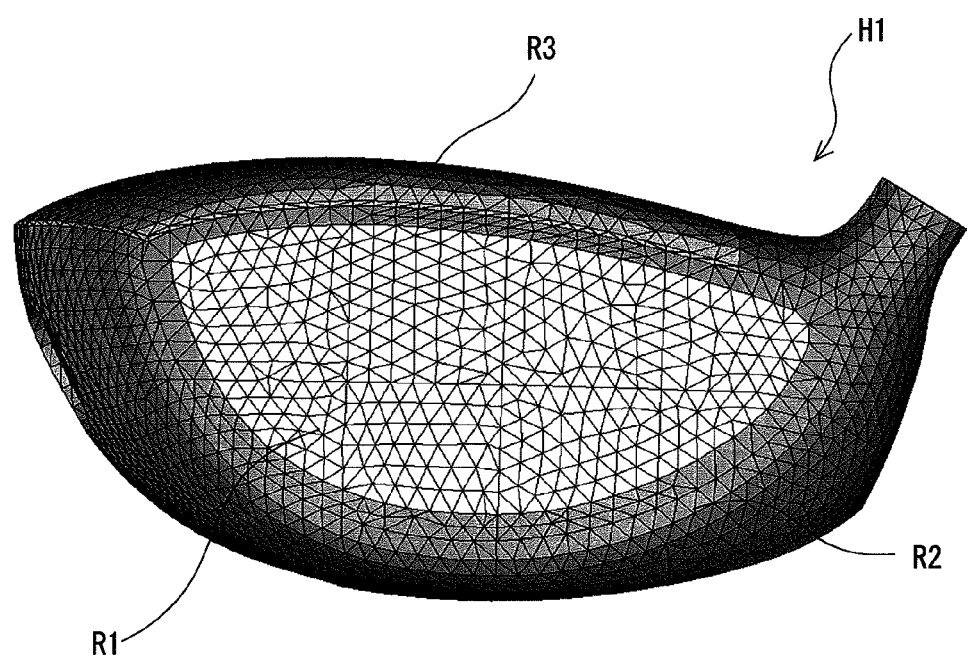
FIG. 8 is a front view of a head according to example, and uses a CAD screen image.
Figure 9:
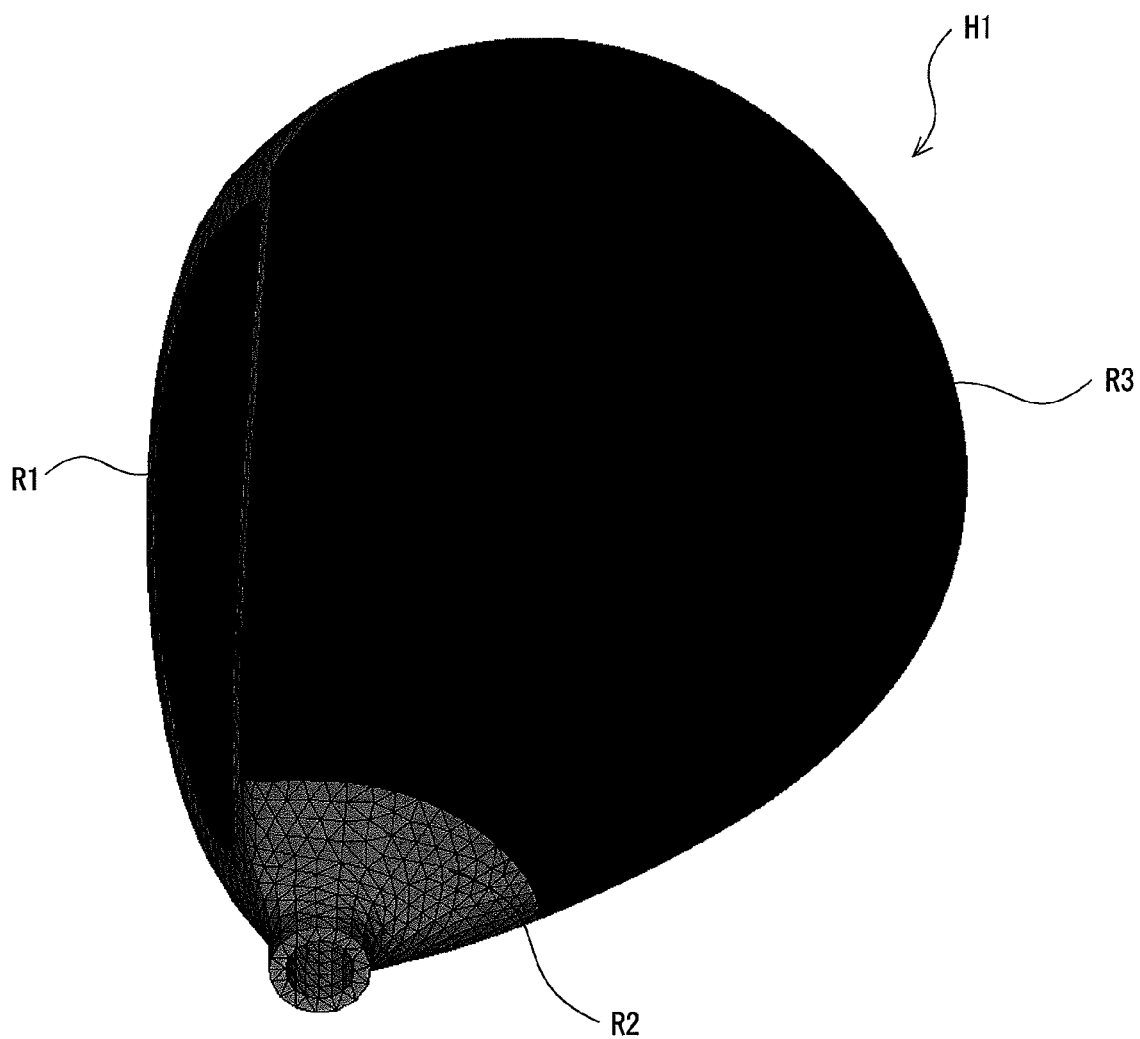
FIG. 9 is the same plan view as FIG. 7, clarifies the distinction of regions simultaneously using FIGS. 7 and 9, and uses a CAD screen image.
Figure 10:
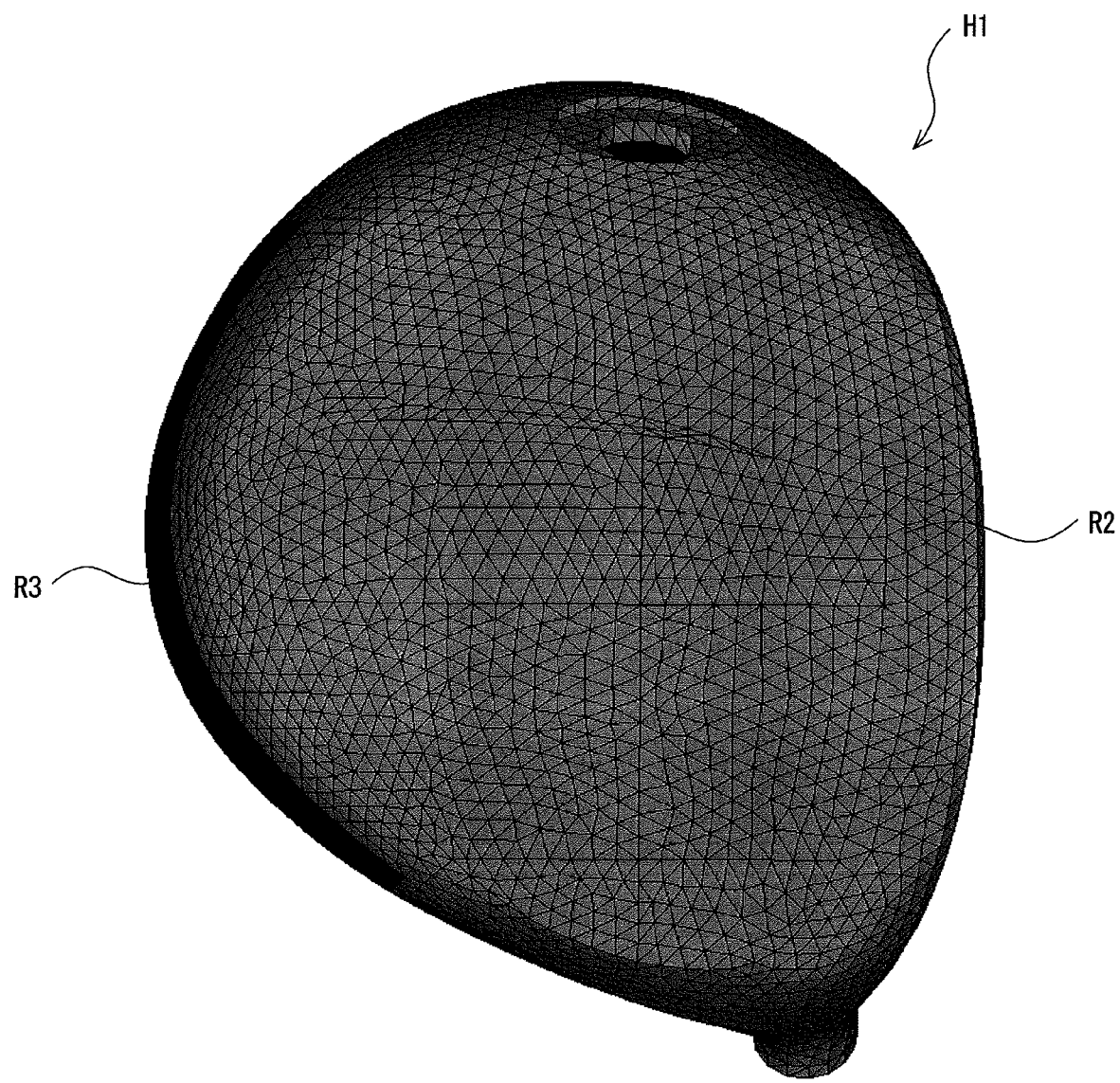
FIG. 10 is a bottom view of a head according to example, and uses a CAD screen image.

FIG. 7 is a plan view of the head H1. FIG. 8 is a front view of the head H1. FIGS. 7 and 8 are CAD screen images. As shown in FIGS. 7 and 8, the head H1 has a first region R1, a second region R2, and a third region R3. These three regions are divided by shading in FIGS. 7 and 8. The first region R1 is a portion shown so as to have the lowest deepness. The first region R1 occupies most of a face. The first region R1 occupies the central portion of the face. The second region R2 is a portion shown so as to have the highest deepness. A sole and a hosel belong to the second region R2. The third region R3 is a portion except the first region R1 and the second region R2. Most of a crown belongs to the third region R3. FIGS. 9 and 10 also show the head H1. FIG. 9 is a plan view of the head H1. FIG. 10 is a bottom view of the head H1. In FIGS. 9 and 10, the third region R3 is coated so as to have a high deepness in order to clearly distinguish the second region R2 from the third region R3. In FIG. 9, the first region R1 is also coated so as to have a high deepness.

In example 1, the material B was used for the first region R1; the material C was used for the second region R2; and the material D was used for the third region R3. The mesh division lines of the calculation model were shown in FIGS. 7 to 10.

Unit impact response analysis was performed using FEM, using the calculation model of the obtained head. A unit impact force was applied to the center of the face. The unit impact force was a force changed in a sine curve shape. The imparting time of the unit impact force was set to 0.3 msec. The constraint condition was set to free. The above-mentioned "LS-DYNA" was used for the unit response analysis.

Acceleration data of time history was obtained by the unit impact response analysis. The acceleration data was Fourier transformed, and the unit impact force was also Fourier transformed. A frequency response function (inertance) was obtained by dividing the Fourier transformed acceleration data by the Fourier transformed unit impact force. The above-mentioned "MATLAB" was used for calculating the frequency response function.

Next, a modal damping ratio was calculated using the frequency response function. The above-mentioned "ME' scopeVES" was used for calculating the modal damping ratio. A mode characteristic was identified by curve fitting. An orthogonal polynomial method was employed as a method for the curve fitting.

Figure 11:
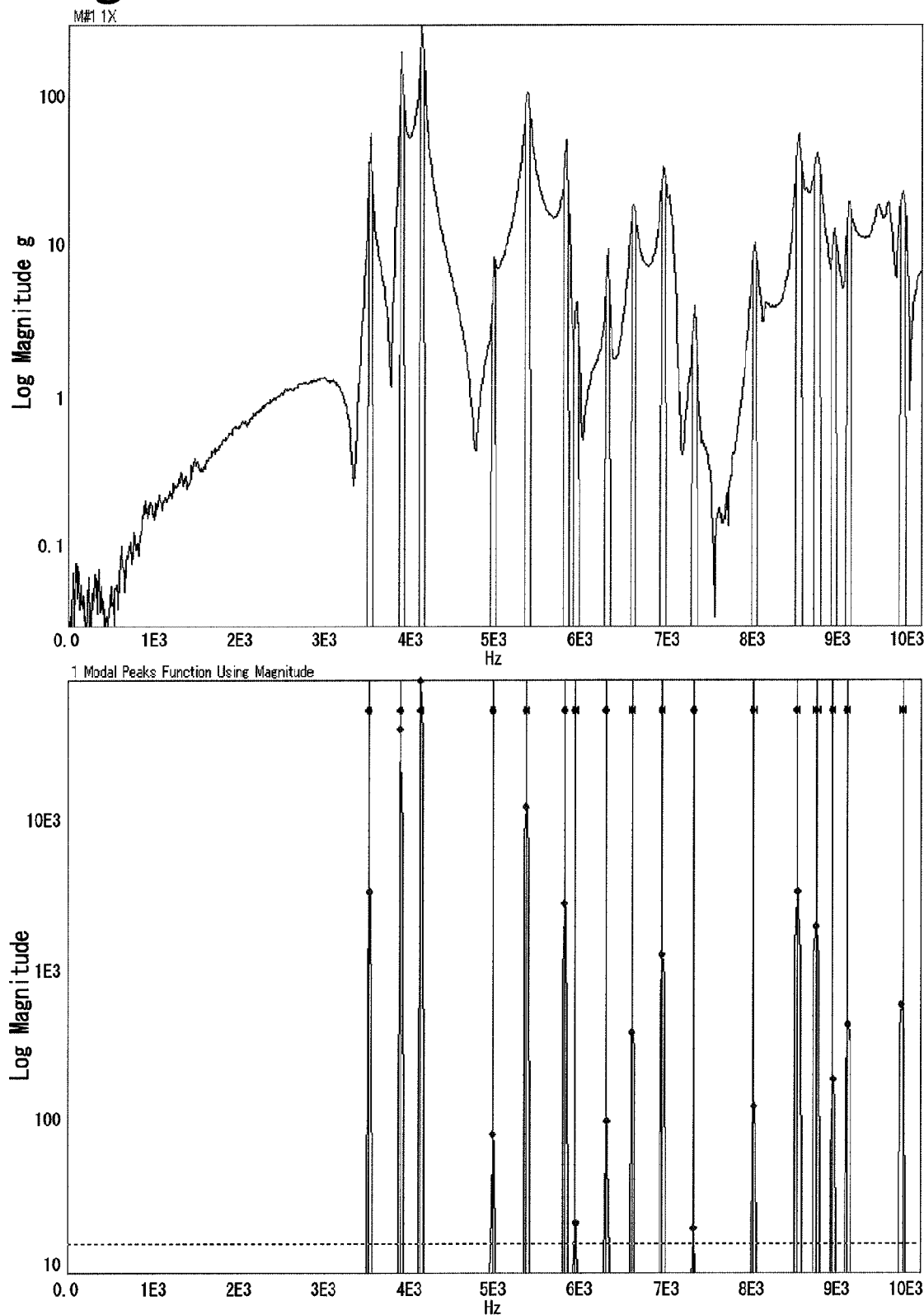
FIG. 11 is a graph showing a frequency response function or the like of example 1.

FIG. 11 shows an output screen image related to the modal damping ratio. The upper graph of FIG. 11 shows the frequency response function. A line showing a range referred for calculating the modal damping ratio is appended for each peak in the upper graph. The lower graph of FIG. 11 shows the detection positions of the peaks. FIG. 11 is an output screen image in the above-mentioned "ME' scopeVES". The calculated modal damping ratios are shown in the following Table 7.

TABLE 7

Modal damping ratio of Example 1

| Frequency (Hz) | Modal damping ratio (%) |
|---|---|
| 3520 | 0.286 |
| 3890 | 0.303 |
| 4140 | 0.399 |
| 4980 | 0.294 |
| 5370 | 0.539 |
| 5830 | 0.222 |
| 5940 | 0.383 |
| 6310 | 0.196 |
| 6610 | 0.508 |
| 6960 | 0.346 |
| 7330 | 0.201 |
| 8040 | 0.394 |
| 8560 | 0.266 |
| 8780 | 0.407 |
| 8970 | 0.237 |
| 9140 | 0.301 |
| 9790 | 0.350 |

Example 2

The materials A, B, and C were employed as materials of a composite head. A coefficient of a generalized Maxwell model for each of the materials was obtained using the sheet of FIG. 6. The maximum allocation frequency was set to 10000 Hz. In each of the materials A, B, and C, a material damping ratio $\zeta$ was a representative value having no frequency dependency.

Three-dimensional data of a head H1 was used as in example 1. In example 2, the material B was used for the first region R1; the material C was used for the second region R2; and the material A was used for the third region R3.

Unit impact response analysis was performed using the calculation model of the obtained head. A frequency response function (inertance) and a modal damping ratio were obtained in the same manner as in example 1.

Figure 12:
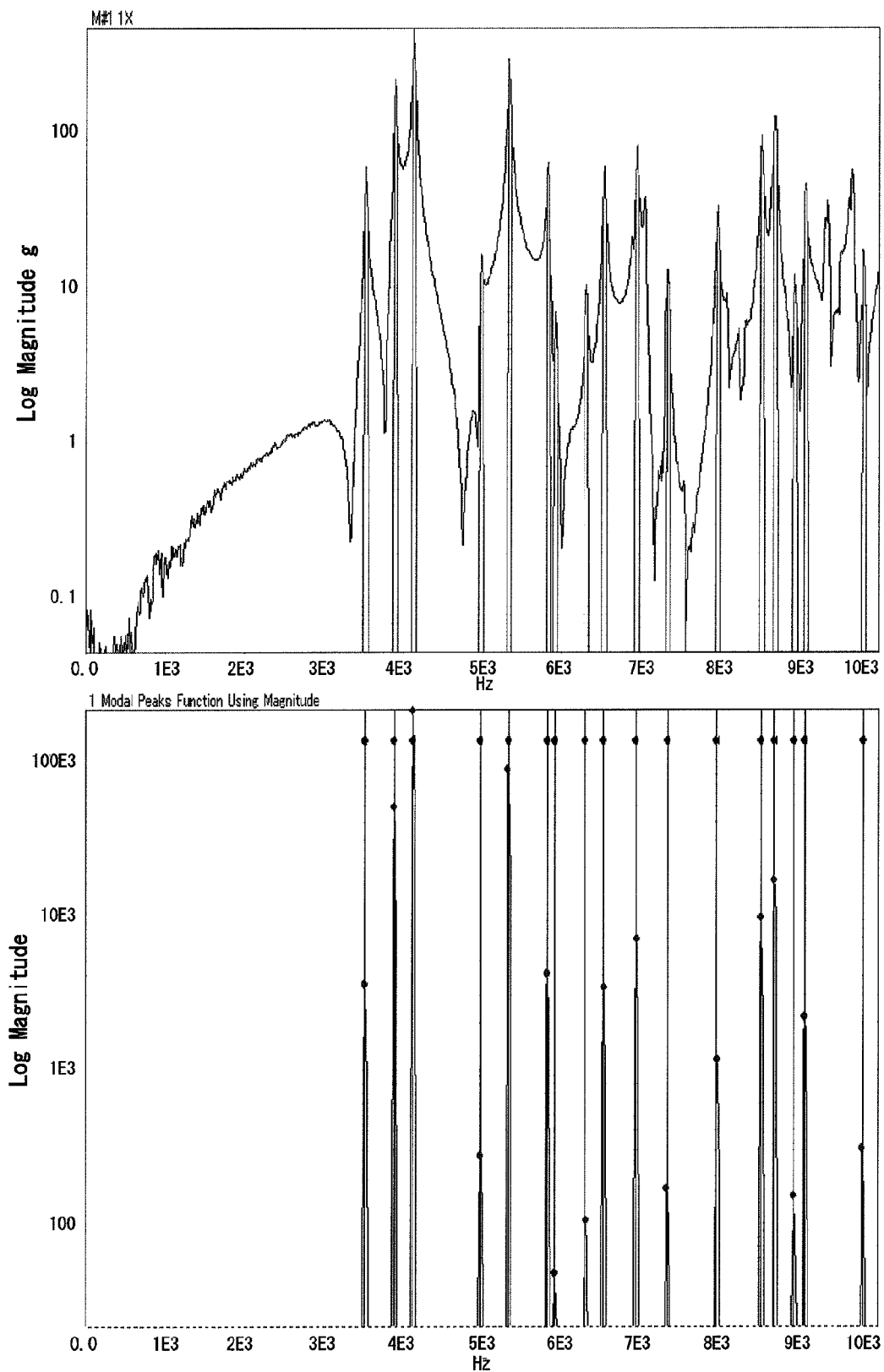
FIG. 12 is a graph showing a frequency response function or the like of example 2.

FIG. 12 shows an output screen image related to a modal damping ratio. FIG. 12 corresponds to FIG. 11 in example 1. The calculated modal damping ratios are shown in the following Table 8.

TABLE 8

Modal damping ratio of Example 2

| Frequency (Hz) | Modal damping ratio (%) |
|---|---|
| 3520 | 0.279 |
| 3890 | 0.297 |
| 4120 | 0.255 |
| 4970 | 0.267 |
| 5320 | 0.233 |
| 5820 | 0.243 |
| 5910 | 0.222 |
| 6310 | 0.193 |
| 6540 | 0.193 |
| 6950 | 0.188 |

TABLE 8-continued

Modal damping ratio of Example 2

| Frequency (Hz) | Modal damping ratio (%) |
|---|---|
| 7340 | 0.187 |
| 7960 | 0.202 |
| 8520 | 0.184 |
| 8690 | 0.166 |
| 8930 | 0.188 |
| 9060 | 0.189 |
| 9800 | 0.137 |

As described above, the materials in examples 1 and 2 are as follows.

Example 1 first region R1 (almost face)=material B (a titanium alloy is assumed; $\zeta$=0.3)
second region R2 (almost sole)=material C (a titanium alloy is assumed; $\zeta$=0.3)
third region R3 (almost crown)=material D (CFRP is assumed; $\zeta$=1.5)

Example 2 first region R1 (almost face)=material B (a titanium alloy is assumed; $\zeta$=0.3)
second region R2 (almost sole)=material C (a titanium alloy is assumed; $\zeta$=0.3)
third region R3 (almost crown)=material A (CFRP is assumed; $\zeta$=0.3)

In example 2, the material damping ratio $\zeta$ is 0.3% in all the regions (regions R1, R2, and R3) of the head. Therefore, example 2 is similar to a head made of a single material. On the other hand, in example 1, the material damping ratio $\zeta$ of the third region R3 (most of a crown part) is set to 1.5%, and the material damping ratios $\zeta$ in the remaining regions R1 and R2 are set to 0.3%. Therefore, example 1 is similar to a composite head including a metal and CFRP.

Figure 13:
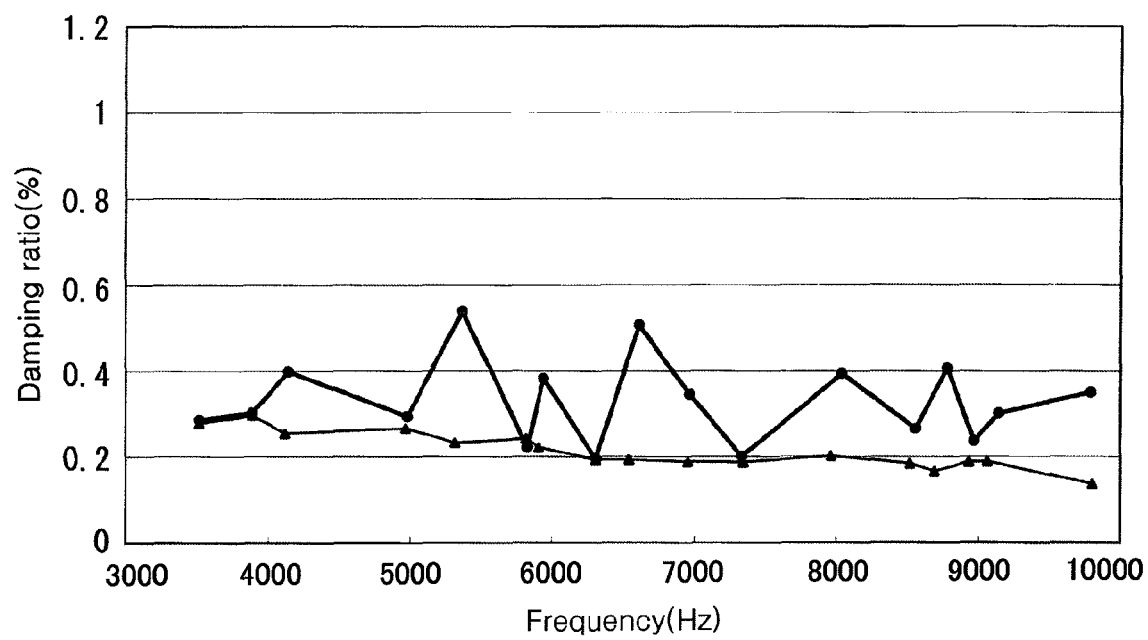
FIG. 13 is a graph showing modal damping ratios of examples 1 and 2.

FIG. 13 is a graph showing the modal damping ratios of examples 1 and 2. A thick line shows the modal damping ratio of example 1. A thin line shows the modal damping ratio of example 2. As shown in the graph, a mode (frequency) in which example 1 is close to example 2 exists. By contrast, a mode (frequency) in which example 1 is apart from example 2 also exists.

In the natural mode shape in the mode in which example 1 is close to example 2, vibration in the regions R1 and R2 (the face and the sole) is considered to be large. On the other hand, in the natural mode shape in the mode in which example 1 is apart from example 2, vibration in the region R3 (crown) is considered to be large. In example 1, the material damping ratio $\zeta$ of the third region R3 is 1.5%. By contrast, in example 2, the material damping ratio $\zeta$ of the third region R3 is 0.3%. In the natural mode shape in which the vibration of the third region R3 was large, the difference between the modal damping ratios became large. For example, the above-mentioned natural mode shape Lm can be specified based on the difference between example 1 and example 2. In the case of the embodiment, the natural mode shape in the mode in which the difference between example 1 and example 2 is large can be set to the natural mode shape Lm. For example, attention can be directed to the natural mode shape Lm in order to lengthen a ball hitting sound. That is, a material having a small material damping ratio $\zeta$ can be alternatively disposed in a portion having large vibration in the natural mode shape Lm. Thus, the materials can be disposed so as to bring about a long-time ball hitting sound in consideration of the natural mode shape.

Reference Example 1

The validity of a modal damping ratio to be calculated was examined using a calculation model of a flat plate shape comprising a single material. The shape of the flat plate was set to a rectangle. The flat plate had 201 mm long, 110 mm wide, and 2.48 mm thickness. A plate including only the material F was used as a calculation model. The damping ratio $\zeta$ of a material F was 1.5%, and the damping ratio $\zeta$ of the material was used as a representative value having no frequency dependency.

Figure 14:
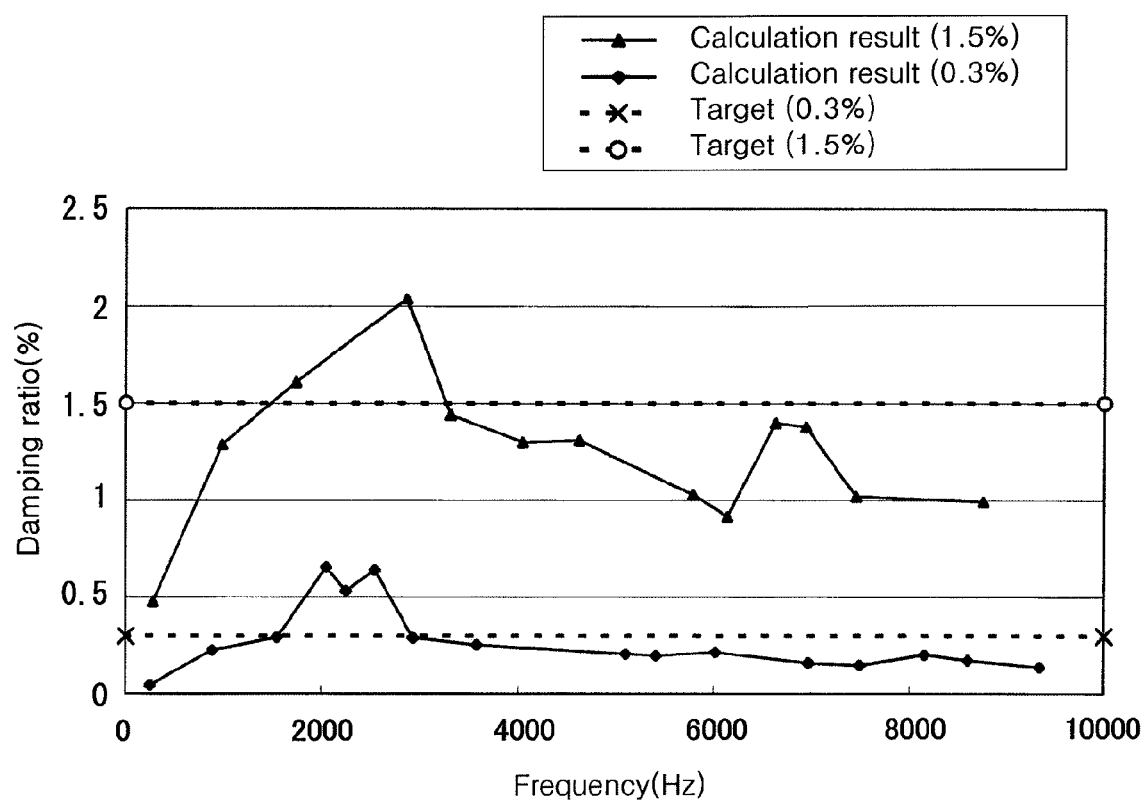
FIG. 14 is a graph showing modal damping ratios of reference examples 1 and 2.

A modal damping ratio of the calculation model was calculated in the same manner as in example 1. A constraint condition was set to free. An acting point of a unit impact force was set to the center of the rectangle. The obtained modal damping ratio is shown in the graph of FIG. 14. An upper line graph of FIG. 14 shows the calculation result of reference example 1.

Reference Example 2

A modal damping ratio of reference example 2 was calculated in the same manner as in reference example 1 except that the material was changed to the material E from the material F. The damping ratio $\zeta$ of the material E was 0.3%, and the damping ratio $\zeta$ of the material was used as a representative value having no frequency dependency. The modal damping ratio is shown in the graph of FIG. 14. A lower line graph of FIG. 14 shows the calculation result of reference example 2.

As shown in the graph of FIG. 14, reference example 1 having a material damping ratio $\zeta$ of 1.5% has a modal damping ratio significantly larger than that of reference example 2 having a material damping ratio $\zeta$ of 0.3%. Therefore, it was shown that the generalized Maxwell model used in the above-mentioned example is a viscoelasticity model which can significantly reflect the difference between 0.3% and 1.5%. The generalized Maxwell model can be effectively used in the design of the composite head including CFRP and a metal (a titanium alloy or the like), for example.

The method described above can be applied to the simulation of the ball hitting sound and the design of the golf club head, or the like.

The description hereinabove is merely for an illustrative example, and various modifications can be made in the scope not to depart from the principles of the present invention.

What is claimed is:

1. A computer implemented method for predicting a modal damping ratio for a mode of vibration, of a composite head comprising two or more kinds of materials comprising a first material and a second material, the method comprising the steps of:
   computing, using a computer, at least a coefficient Px of a generalized Maxwell model M1 in the first material using a known material damping ratio $\zeta 1$;
   obtaining a calculation model of the head using the generalized Maxwell model M1; and
   calculating, using the computer, the modal damping ratio of the head based on analysis of the head using the calculation model.

2. The method according to claim 1 comprising the steps of:
   computing the coefficient Px of the generalized Maxwell model M1 in the first material using the known material damping ratio $\zeta 1$;
   computing a coefficient Py of a generalized Maxwell model M2 in the second material using a known material damping ratio $\zeta 2$;
   obtaining the calculation model of the head using the generalized Maxwell model M1 and the generalized Maxwell model M2; and
   calculating the modal damping ratio of the head based on the analysis of the head using the calculation model.

3. The method according to claim 2, wherein the first material is carbon fiber reinforced plastic (CFRP), and the second material is a titanium alloy.

4. The method according to claim 2, wherein a representative value D1 having no frequency dependency is used as the material damping ratio $\zeta 1$, and a representative value D2 having no frequency dependency is used as the material damping ratio $\zeta 2$.

5. The method according to claim 2, wherein a number of parallel Maxwell models is equal to or greater than two in the generalized Maxwell model M1; and
   a number of parallel Maxwell models is equal to or greater than two in the generalized Maxwell model M2.

6. The method according to claim 1, wherein the analysis of the head comprises the steps of:
   performing impact response analysis;
   calculating a frequency response function based on a result of the impact response analysis; and
   calculating the modal damping ratio of the head based on the frequency response function.

7. A method for designing a golf club head, comprising the steps of:
   analyzing the head and calculating the modal damping ratio using the method according to claim 1; and
   determining disposal of materials so as to bring about a long-time ball hitting sound in consideration of the relation between the modal damping ratio and a natural mode shape in each mode of vibration.

8. The method according to claim 7, wherein the determining step comprises the steps of:
   specifying a natural mode shape Lm having a comparatively large modal damping ratio; and
   replacing at least a part of a region vibrating in the natural mode shape Lm with a material having a comparatively small material damping ratio.

9. The method according to claim 8, wherein the material having a comparatively small material damping ratio is a material having the smallest material damping ratio $\zeta$, of the materials used for the composite head.

10. The method according to claim 8, wherein the replacing step is the step of replacing at least a part of the region vibrating in the natural mode shape Lm with a titanium alloy in place of carbon fiber reinforced plastic (CFRP).

11. The method according to claim 7, wherein the determining step comprises the steps of:
    specifying a natural mode shape Ls having a comparatively small modal damping ratio; and
    replacing at least a part of a region unvibrating in the natural mode shape Ls with a material having a comparatively large material damping ratio $\zeta$.

12. The method according to claim 7, wherein the determining step comprises the steps of:
    specifying a natural mode shape Lm having a comparatively large modal damping ratio; and
    subjecting at least a part of a region vibrating in the natural mode shape Lm to dimensional change and/or shape change.

13. A ball hitting sound simulation method using the method according to claim 1.

* * * * *